United States Patent
Linnen et al.

(10) Patent No.: US 11,640,252 B2
(45) Date of Patent: May 2, 2023

(54) IDLE-POWER MITIGATION CIRCUIT

(71) Applicant: Western Digital Technologies, Inc., San Jose, CA (US)

(72) Inventors: Daniel J. Linnen, Naperville, IL (US); Gunter Knestele, Costa Mesa, CA (US); Kirubakaran Periyannan, Santa Clara, CA (US); San A. Phong, Cerritos, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 92 days.

(21) Appl. No.: 17/205,094

(22) Filed: Mar. 18, 2021

(65) Prior Publication Data
US 2022/0300171 A1 Sep. 22, 2022

(51) Int. Cl.
*G06F 3/06* (2006.01)

(52) U.S. Cl.
CPC .......... *G06F 3/0625* (2013.01); *G06F 3/0655* (2013.01); *G06F 3/0679* (2013.01)

(58) Field of Classification Search
USPC .................................................. 711/154, 103
See application file for complete search history.

(56) References Cited

U.S. PATENT DOCUMENTS

| | | | |
|---|---|---|---|
| 5,765,001 A * | 6/1998 | Clark | G06F 1/30 713/340 |
| 6,483,745 B2 | 11/2002 | Saeki | |
| 8,880,775 B2 | 11/2014 | Stefanus et al. | |
| 9,304,560 B2 | 4/2016 | Laird et al. | |
| 9,658,669 B2 | 5/2017 | Wang et al. | |
| 9,696,911 B2 | 7/2017 | Kim et al. | |
| 2004/0042138 A1* | 3/2004 | Saito | G06F 1/263 361/90 |
| 2010/0030999 A1* | 2/2010 | Hinz | G06F 3/0679 711/E12.001 |
| 2011/0181117 A1* | 7/2011 | Goja | H04M 1/24 307/80 |
| 2012/0206116 A1* | 8/2012 | Fricker | H02M 3/158 323/271 |
| 2017/0230907 A1* | 8/2017 | Rose | H04B 1/40 |
| 2020/0133379 A1 | 4/2020 | Muccini et al. | |

* cited by examiner

*Primary Examiner* — Hashem Farrokh
(74) *Attorney, Agent, or Firm* — Patterson + Sheridan, LLP; Steven H. VerSteeg (57) ABSTRACT

A data storage device includes a memory device, an internal power supply, and a controller. When the data storage device is in an idle power state, the controller is configured to electrically isolate the data storage device from an external power source and draw power from the internal power supply to perform data storage operations. The power utilized for the data storage operations while the data storage device is in the idle power state may be exclusively from the internal power supply or a mixture of the internal power supply and the external power supply. The total power utilized during the idle power state is less than a threshold that is relative to the active power of the data storage device or at a fixed value.

20 Claims, 7 Drawing Sheets

IDLE-POWER MITIGATION CIRCUIT

BACKGROUND OF THE DISCLOSURE

Field of the Disclosure

Embodiments of the present disclosure generally relate to data storage devices, such as solid state drives (SSDs), and idle power consumption.

Description of the Related Art

When the data storage drive is in an idle power state, the host device may provide a minimal amount of power, such that the data storage device may boot up or initialize quickly upon receiving a command or notification from the host device. While the data storage device is in the idle power state, the total power consumption of the data storage device from the host device should be below a threshold that is either relative to the active power of the data storage device or at a fixed value.

Data storage operations, such as garbage collection, data scans, data refreshes, logging, etc. (i.e., background operations), may be executed while the data storage device is in an active power state as well as while the data storage device is in the idle power state. However, in order to perform the data storage operations, additional power may be allocated or current power may be re-allocated to complete the tasks. While the data storage device is in the active power state, the additional power and/or the re-allocated power may be part of the total power budget. However, when the data storage device is in the idle power state, the background operations may draw or require additional power that may result in exceeding the threshold for idle power consumption from the host device.

Therefore, there is a need in the art to improve the idle power consumption relative to the supplied host power while the data storage device is in an idle power state.

SUMMARY OF THE DISCLOSURE

The present disclosure generally relates to data storage devices, such as solid state drives (SSDs), and idle power consumption. A data storage device includes a memory device, an internal power supply, and a controller. When the data storage device is in an idle power state, the controller is configured to electrically isolate the data storage device from an external power source and draw power from the internal power supply to perform data storage operations. The power utilized for the data storage operations while the data storage device is in the idle power state may be exclusively from the internal power supply or a mixture of the internal power supply and the external power supply. The total power utilized during the idle power state is less than a threshold that is relative to the active power of the data storage device or at a fixed value.

In one embodiment, a data storage device includes a memory device, an internal power supply, and a controller coupled to the memory device and the internal power supply. The controller is configured to perform the following during data storage device idle time: electrically isolate the data storage device from an external power source and draw power from the internal power supply to perform a data storage operation. The performing the data storage operation includes at least one of garbage collection, logging, saving of a L2P table, and scanning background data.

In another embodiment, a data storage device includes a memory device, an internal power supply, a switching circuit coupled between the internal power supply and a line for receiving power from an external power source, and a controller coupled to the memory device and the switching circuit. The controller is configured to cause the switching circuit to switch between drawing power from the internal power supply and drawing power from the external power source during data storage operations during data storage device idle time. The data storage operations includes at least one of garbage collection, logging, saving of a L2P table, and scanning background data.

In another embodiment, a data storage device includes memory means, internal power supply means, and means to perform data storage operations by drawing power from the internal power supply means during data storage device idle time. The data storage operations includes at least one of garbage collection, logging, saving of a L2P table, and scanning background data.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and idle power consumption. A data storage device includes a memory device, an internal power supply, and a controller. When the data storage device is in an idle power state, the controller is configured to electrically isolate the data storage device from an external power source and draw power from the internal power supply to perform data storage operations. The power utilized for the data storage operations while the data storage device is in the idle power state may be exclusively from the internal power supply or a mixture of the internal power supply and the external power supply. The total power utilized during the idle power state is less than a threshold that is relative to the active power of the data storage device or at a fixed value.

Figure 1:
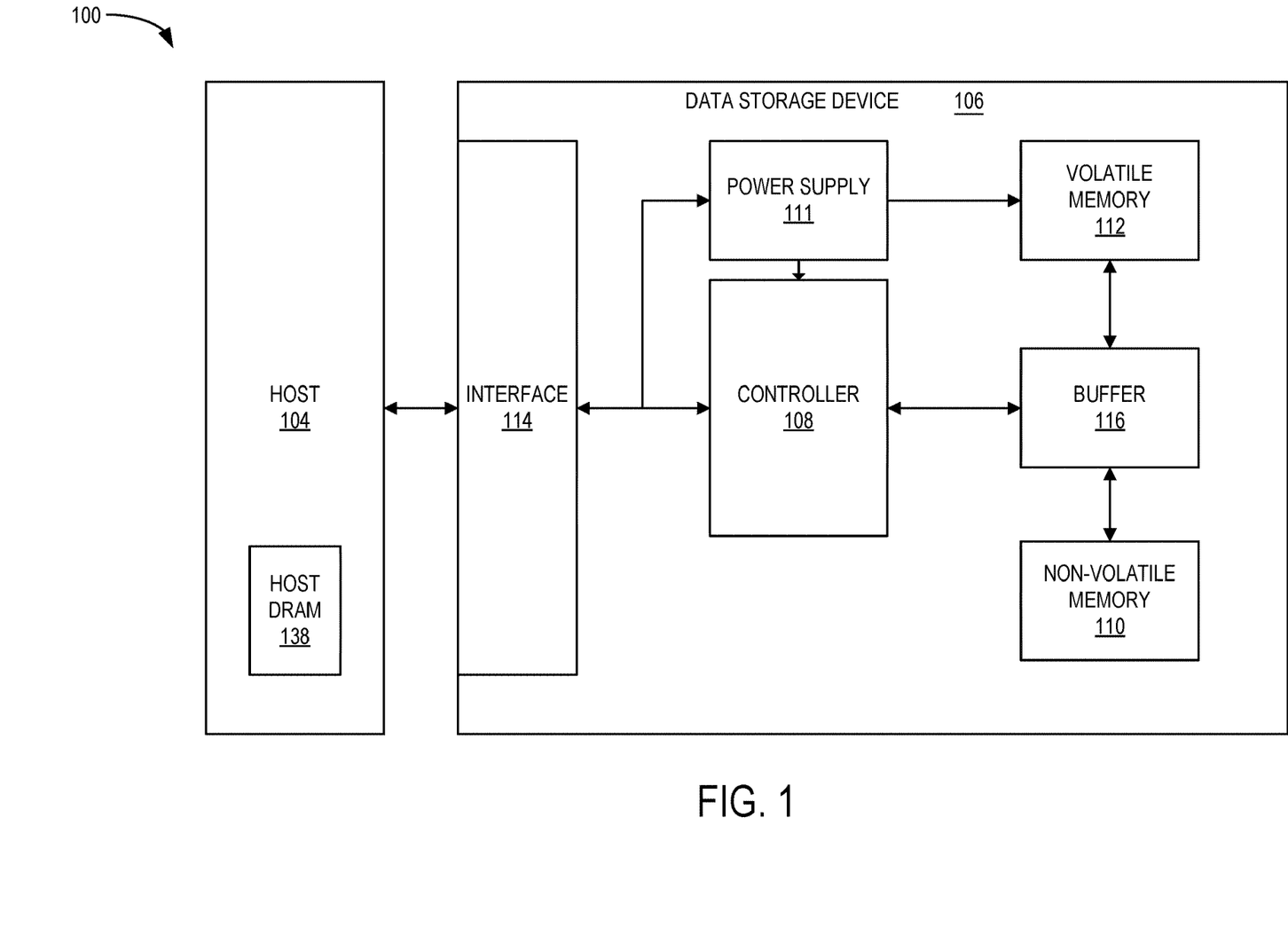
FIG. 1 depicts a schematic block diagram illustrating a storage system in which data storage device may function as a storage device for a host device, according to certain embodiments.

FIG. 1 depicts a schematic block diagram illustrating a storage system 100 in which data storage device 106 may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, an interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe×1, ×4, ×8, ×16, PCIe Mini Card, MiniPCI, etc.), U.2, U.3, M.2, Enterprise and Data SSD Form Factor (EDSFF) long, EDSFF short, and the like. In some examples, the data storage device 106 may be directly coupled (e.g., directly soldered) to a motherboard of the host device 104.

The interface 114 of the data storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The electrical connection of the interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of the interface 114 may also permit the data storage device 106 to receive power from the host device 104. For example, as illustrated in FIG. 1, the power supply 111 may receive power from the host device 104 via the interface 114.

The NVM 110 may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit of NVM 110 may receive a message from the controller 108 that instructs the memory unit to retrieve data. In some examples, each of the memory units may be referred to as a die. In some examples, a single physical chip may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR based flash memory devices and may store data based on a charge contained in a floating gate of a transistor for each flash memory cell. In NVM flash memory devices, the flash memory device may be divided into a plurality of dies, where each die of the plurality of dies includes a plurality of blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The data storage device 106 includes a power supply 111, which may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, supercapacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may include one or more volatile memory devices. In some examples, the controller 108 may use volatile memory 112 as a cache. For instance, the controller 108 may store cached information in volatile memory 112 until cached information is written to NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The data storage device 106 includes a controller 108, which may manage one or more operations of the data storage device 106. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
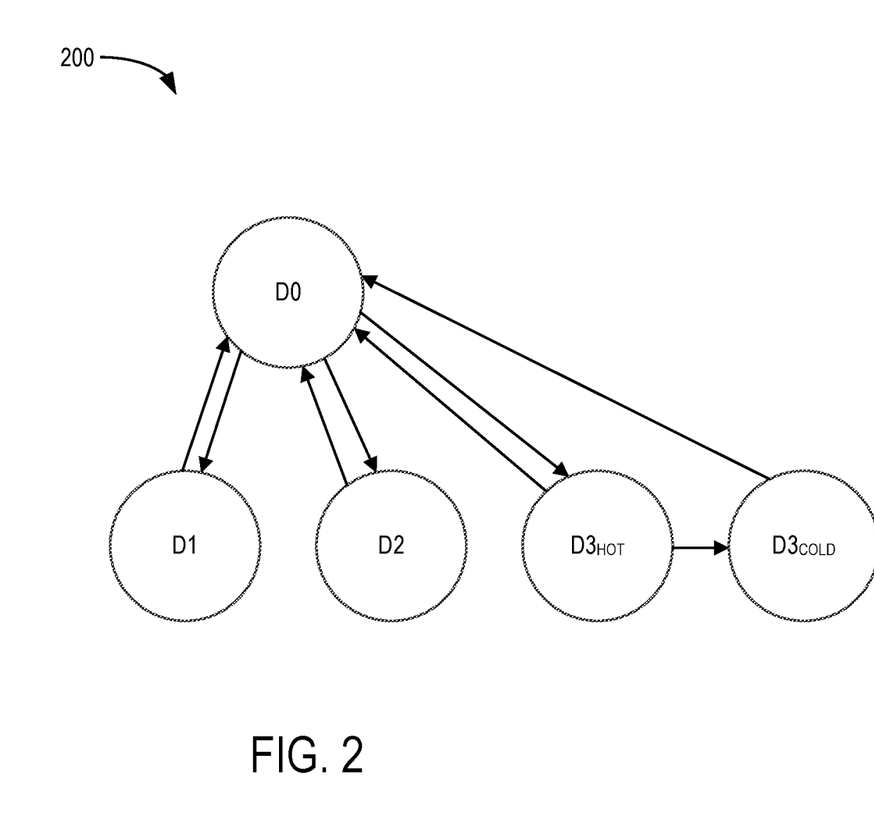
FIG. 2 depicts a schematic flow diagram of the power states of a data storage device, according to certain embodiments.

FIG. 2 depicts a schematic flow diagram of a power state diagram 200 of a data storage device, such as the data storage device 106 of FIG. 1, according to certain embodiments. The data storage device 106 operates at various power states, such as D0, D1, D2, $D3_{HOT}$, and $D3_{COLD}$. It is contemplated that other power states, as well as fewer than or greater than the described number of power states, are applicable to the described embodiments. The host, such as the host device 104 of FIG. 1, may provide a suitable amount of power to the data storage device 106 through one or more pins on the interface, such as the interface 114 of FIG. 1.

The suitable amount of power may be more than or equal to the amount of power the data storage device 106 requires to operate. For example, the power a data storage device 106 may receive from the host device 104 may be about 5 W. Furthermore, a data storage device 106 may draw out about 500 mW to about 15 W of power from the host device 104. The previously mentioned values for power are not intended to be limiting, but to provide a reference.

As mentioned previously, the data storage device 106 may have several power states, such as D0, D1, D2, $D3_{HOT}$, and $D3_{COLD}$. Each of the power states are associated with a distinct data storage device 106 operation. The power states are characterized by the following attributes: power consumption, data storage device context, data storage device driver behavior, restore time, and wake-up capability. Power states are numbered sequentially, where higher numbers represent lower power requirements and corresponding higher exit latencies. Furthermore, each power state has an associated power requirement and an exit latency. As shown in FIG. 2, the data storage device may transition from the D0 to either the D1, the D2, or the $D3_{HOT}$ power states. When the data storage device 106 shuts down, the power state of the data storage device exits from $D3_{HOT}$ and enters $D3_{COLD}$.

The D0 power state is considered a fully operational power state, where the data storage device 106 is fully on and operational. An operational power state refers to the ability of a host device 104 to communicate with the data storage device 106 in order to perform input/output (I/O) operations and the data storage device 106 may generate interrupts. Interrupts are an automatic transfer of firmware execution due to a system timer or a user command. The D0 power state has the highest level of continuous power consumption for the data storage device 106.

After a period of idle time (e.g., no 1/O operations or the like), the host device 104 may instruct the data storage device 106 to enter a low power consumption power state, such as the D1, the D2, and the $D3_{HOT}$ power states. When the data storage device 106 is no longer in use, the host device 104 may instruct the data storage device 106 to enter a non-operational power state $D3_{COLD}$ from the $D3_{HOT}$ power state to limit idle power consumption to a minimal value. In order for I/O commands to occur, the data storage device is woken up from power states D1, D2, $D3_{HOT}$, and $D3_{COLD}$ and placed into power state D0. In some examples, the D1, D2, and $D3_{HOT}$ power states are idle power states. In another example, the $D3_{COLD}$ power state may also be included as an idle power state in addition to the previously exemplified idle power states.

It is to be understood that the voltage values referenced herein are examples of possible embodiments and are not intended to be limiting.

Figure 3A:
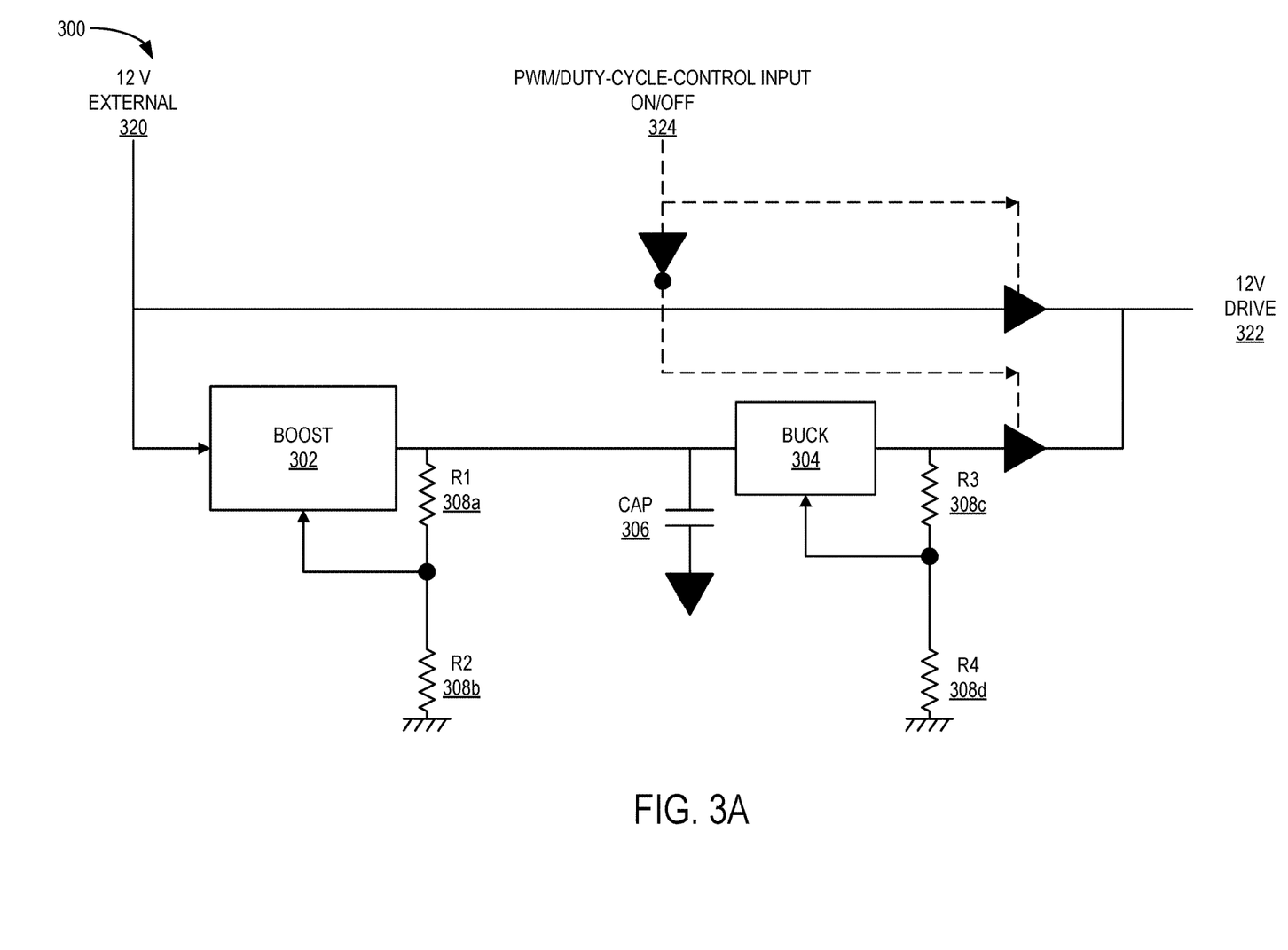
FIGS. 3A and 3B depict schematic illustrations of a power circuit of a data storage device, according to certain embodiments.

FIG. 3A depicts a schematic illustration of a power circuit 300 of a data storage device, according to certain embodiments. The power circuit 300 is coupled to an external source 320, such as a host device 104 of FIG. 1, to provide power to a drive 322, such as a data storage device 106 of FIG. 1. The power provided by the external source 320 may be about 12 V, where the host device 104 provides the about 12 V and the data storage device 106 receives the about 12 V of power. In some cases, power losses may occur due to heat generation and power transfer inefficiencies. However, for simplification of the aspects contemplated herein, the source power may be assumed to be equal to the received power.

The power circuit 300 includes a boost 302 and a buck 304, where the boost 302 amplifies voltage of the input voltage and the buck 304 decreases the voltage of the input voltage. For example, the voltage supplied to the boost 302 is about 12 V. The boost 302 may then output a higher voltage such as about 35 V to allow for greater energy storage in a capacitor 306. When the about 35 V reaches the buck 304, the buck 304 decreases the output voltage to about 12 V. The power circuit 300 also includes the capacitor 306 between the boost 302 and the buck 304. The capacitor 306 stores power, such as between about 12 V and about 35 V, in case of an ungraceful shutdown (UGSD) event occurring, such that data backup processes may complete before the data storage device 106 loses all power. Data backup processes include flushing operations in order to preserve data not yet programmed to NVM, such as the NVM 110 of FIG. 1.

Furthermore, the capacitor 306 may provide power for data storage operations while the drive 322 is in an idle power state. The data storage operations may include, but not limited to, garbage collection, logging, saving of a L2P table, and scanning background data. The capacitor 306 may store up to about 80% of the rated voltage of the capacitor 306, such as about 28 V, in order to maximize the lifespan of the capacitor 306. In order to facilitate the boost 302, the buck 304, and the capacitor 306 functions, the power circuit 300 further includes a first series of resistors, R1 308a and R2 308b, associated with the boost 302 and a second series of resistors, R3 308c and R4 308d, associated with the buck 304. The boost 302 may be coupled between the R1 308a and the R2 308b and the buck 304 may be coupled between the R3 308c and the R4 308d. R2 308b and R4 308d are coupled to ground.

In order to avoid overcharging the capacitor 306, the R1 308a may provide a resistance that is equal to or close to equal to the threshold voltage of the capacitor 306. When the resistance of R1 308a is exceeded, current flows through and back to either the boost 302, through the R2 308b to a ground, or to both. Likewise, in order to avoid providing too much voltage to the drive 322, the R3 308c may have a resistance that is equal to or close to equal to the threshold voltage to be provided to the drive 322. When the R2 308b and the R4 308d resistances are exceeded, the current flows to the ground.

The power circuit 300 further includes a pulse width modulation (PWM)/Duty-Cycle Control Input 324, herein referred to as a PWM 324 for simplification purposes. The PWM 324 reduces the average power delivered by an electrical signal, by effectively chopping the electrical signal up into discrete parts. The average value of voltage and current fed to the drive 322 is controlled by turning the PWM 324 between external source 320 and drive 322 on and off at a fast frequency. For example, during the data storage device 106 operation, the boost 302 may boost the input voltage from about 12 V to about 28 V in order to charge the capacitor 306. The buck 304 then reduces the voltage from about 28 V to about 12 V. The PWM 324 may then swap between the about 12 V supplied by the external source 320 and the about 12 V of output voltage from the buck 304 to provide the data storage device 106 about 12 V of power.

When the drive 322 loses power, such as when the external source 320 has an unexpected shutdown or the drive 322 is suddenly removed from the external source 320, the power stored in the capacitor 306 may be utilized to provide power to the drive 322. For example, the capacitor 306 may store enough power to complete any data backup processes. In another example, the drive 322 may be instructed to enter an idle power state. When the drive 322 is in the idle power state, the external source 320 may decrease the power provided to voltage less than the voltage provided when the drive 322 is in an active power state.

For example, the power provided by the external source 320 while the drive 322 is in the idle power state may be about 2 V. In order for the drive 322 to complete background operations, such as garbage collection, logging, saving of a L2P table, and scanning background data, the drive 322 may require a minimum voltage, such as about 3 V. Because the external source 320 is only providing about 2 V to the drive 322, the remaining power is received from the capacitor 306. In order to provide the total minimum voltage of about 3 V to the drive 322, the PWM 324 swaps between the about 2 V provided by the external source 320 and the voltage provided by the capacitor 306.

Figure 3B:
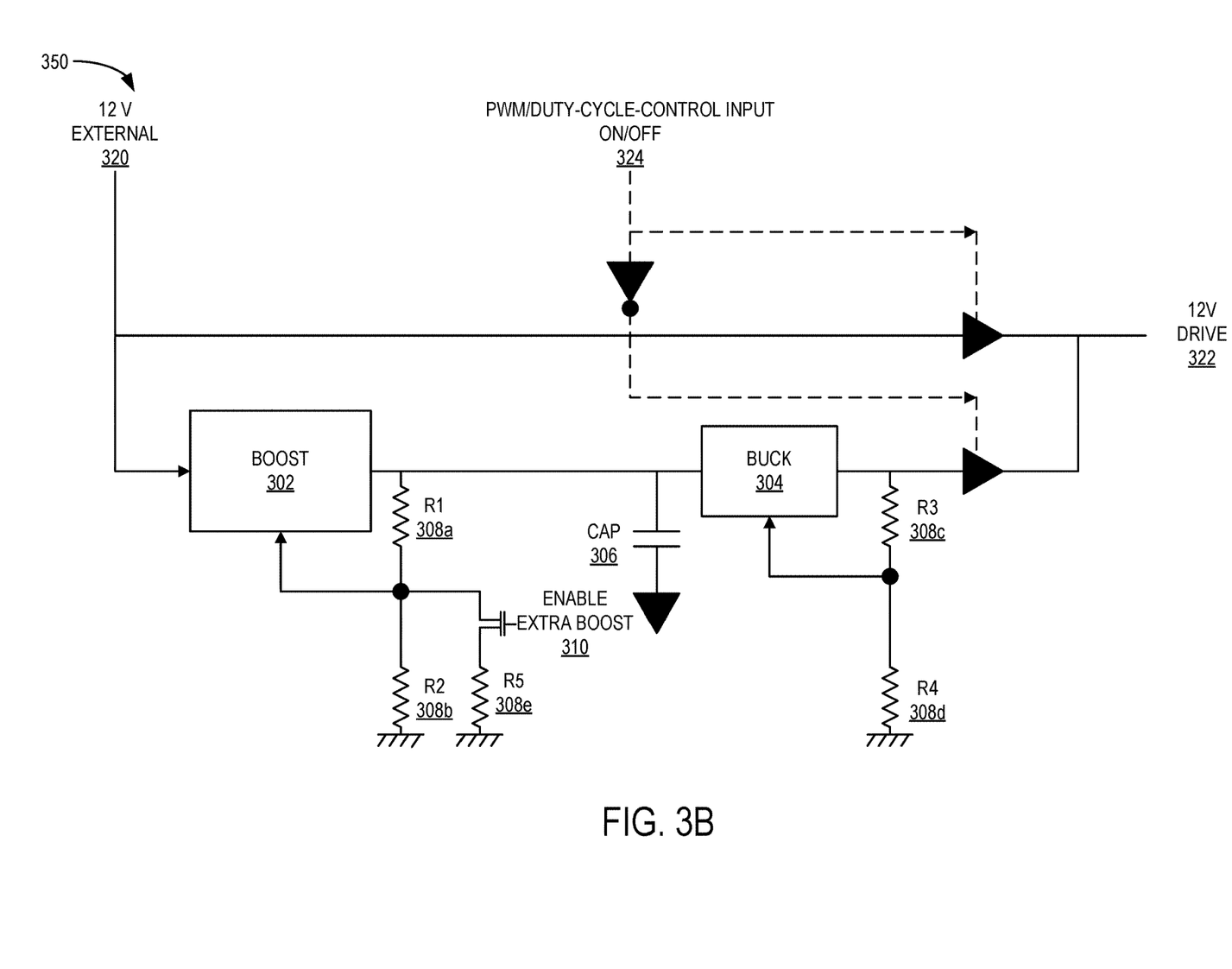

FIG. 3B depicts a schematic illustration of a power circuit 350 of a data storage device, according to certain embodiments. The power circuit 350 may be the power circuit 300 of FIG. 3A with a boosting circuit including an additional resistor, R5 308e, in series with an enable extra boost 310 to provide extra boost to the boost 302. The enable extra boost 310 may be a low resistance transistor. Because the R5 308e has a lower resistance than the R2 308b, the R5 308e goes to a fixed value when the enable extra boost 310 is enabled. The voltage across R2 308b is low in order to enable the boost 302.

When the enable extra boost 310 is toggled, such as by a general purpose input/output (GPIO), the capacitor 306 may be provided extra voltage for a short period of time to complete data backup operations, such as flushing operations, in the case of an UGSD event occurring or during periods where the drive 322 is in an idle power state for an extended period of time. The enable extra boost 310 may be toggled or enabled by firmware of the drive 322 or a controller, such as the controller 108 of FIG. 1, of the drive 322. The capacitor 306 may be charged to a voltage higher than the recommended charged voltage of about 80% of the rated voltage. For example, if 80% of the rated voltage is about 28 V, then enabling or toggling the enable extra boost 310 may cause the capacitor 306 to be charged to about 35 V.

Figure 4A:
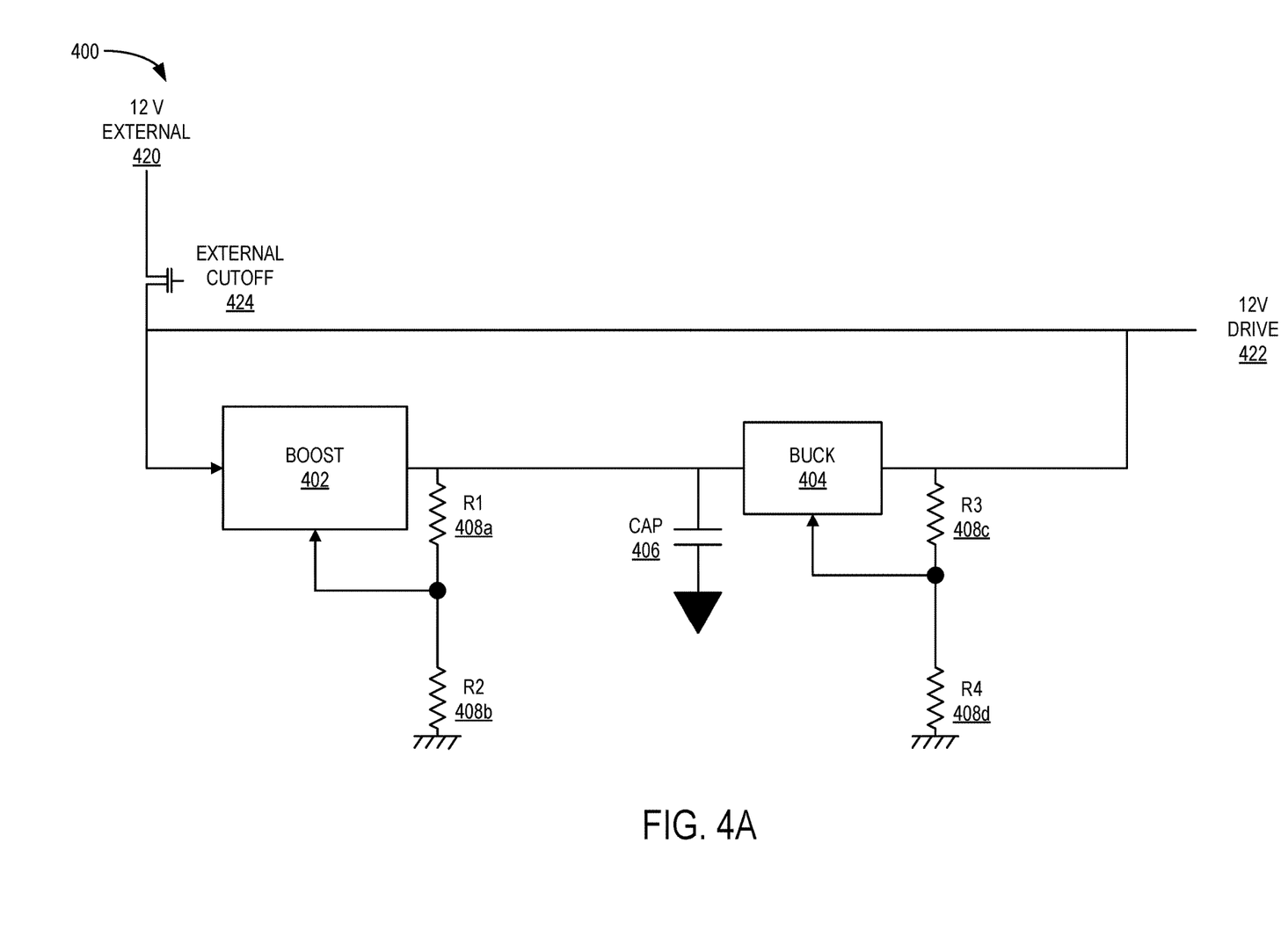
FIGS. 4A and 4B depict schematic illustrations of a power circuit of a data storage device, according to certain embodiments.

FIG. 4A depicts a schematic illustration of a power circuit 400 of a data storage device, according to certain embodiments. Aspects of the power circuit 400 may be similar to aspects of the power circuit 300 of FIG. 3A. For example, an external source 420 may be the external source 320, a boost 402 may be the boost 302, a buck 404 may be the buck 304, a capacitor 406 may be the capacitor 306, and a drive 422 may be the drive 322. Similarly, R1 408a may be R1 308a, R2 408b may be R2 308b, R3 408c may be R3 308c, and R4 408d may be R4 308d. Rather than including a PWM, such as the PWM 324 of FIGS. 3A and 3B, the power circuit 400 includes an external cutoff 424. The external cutoff 424 may include a transistor.

The external cutoff 424 isolates the power circuit 400 from the external source 420 when triggered or cut. For example, when triggering or cutting the external cutoff 424, power is immediately lost from the external source 420. Functions such as autonomous power transition may allow for the instantaneous or nearly instantaneous, in some examples, power switch between the external source 420 and the capacitor 406. In examples, the drive 422 may include logic that estimates when the external source 420 may be isolated from the power circuit 400. For example, after a threshold period of time that the drive 422 is in an idle power state, the external source 420 may signal to the drive 422 to cut power utilizing the external cutoff 424.

Prior to the threshold period of time being reached, a controller, such as the controller 108 of FIG. 1, may determine that the capacitor 406 may require extra power in anticipation to the external cutoff 424 being triggered. The boost 402 may be instructed to provide greater power to the capacitor 406 in response to the anticipation. The capacitor 406 provide power to execute data storage operations, such as garbage collection, logging, saving of a L2P table, and scanning background data, during the drive 422 is in the idle power state as well as executing data backup operations, such as data flushing, when the drive 422 has experienced an UGSD event.

Figure 4B:
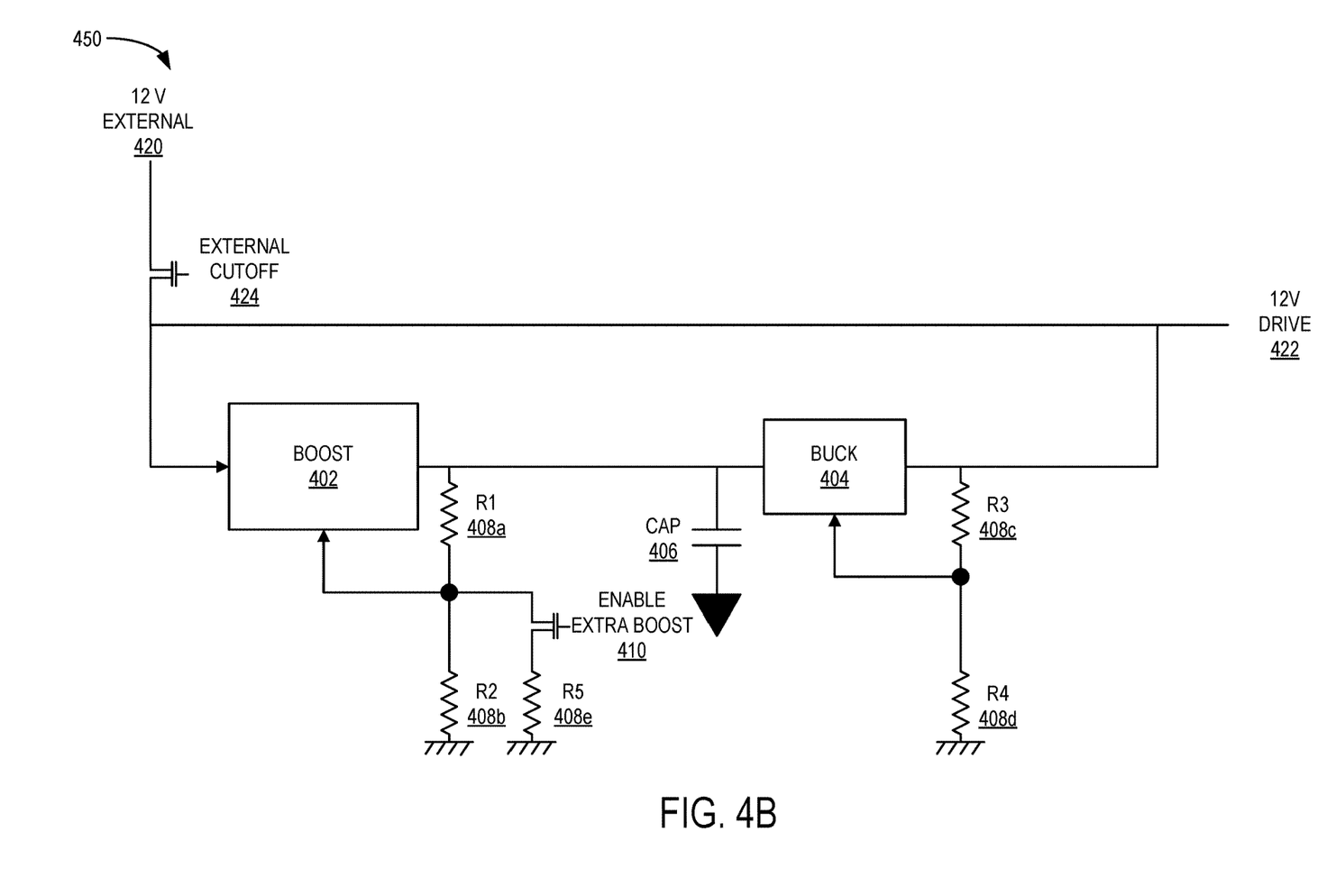

FIG. 4B depicts a schematic illustration of a power circuit 450 of a data storage device, according to certain embodiments. Aspects of the power circuit 450 may be similar to aspects of the power circuit 350 of FIG. 3B. For example, an enable extra boost 410 may be the enable extra boost 310 and a R5 408e may be the R5 308e. The power circuit 450 may be the power circuit 400 of FIG. 4A with a boosting circuit including with an additional resistor, R5 408e, in series with the enable extra boost 410 to provide extra boost to the boost 402. The boost 402 may be coupled between the R1 408a, the R2 408b, and the R5 408e, and the buck 404 may be coupled between the R3 408c and the R4 408d. The enable extra boost 410 may be a low resistance transistor. Because the R5 408e has a lower resistance than the R2 408b, the R5 408e goes to a fixed value when the enable extra boost 410 is enabled. The voltage across R2 408b is low in order to enable the boost 402.

When the enable extra boost 410 is toggled, the capacitor 406 may be provided extra voltage for a short period of time to complete data backup operations, such as flushing operations, in the case of an UGSD event occurring or during periods where the drive 422 is in an idle power state for an extended period of time. The enable extra boost 410 may be toggled or enabled by firmware of the drive 422 or the controller 108. The capacitor 406 may be charged to a voltage higher than the recommended charged voltage of about 80% of the rated voltage. For example, if 80% of the rated voltage is about 28 V, then enabling or toggling the enable extra boost 410 may cause the capacitor 406 to be charged to about 35 V.

It is contemplated that one or more aspects disclosed herein may be combined. Moreover, it is contemplated that one or more aspects disclosed herein may include some or all of the aforementioned benefits. As an example, aspects, components, features, and/or properties of the various power circuits 300, 350, 400, 450 described herein may be combined in other embodiments contemplated.

Figure 5:
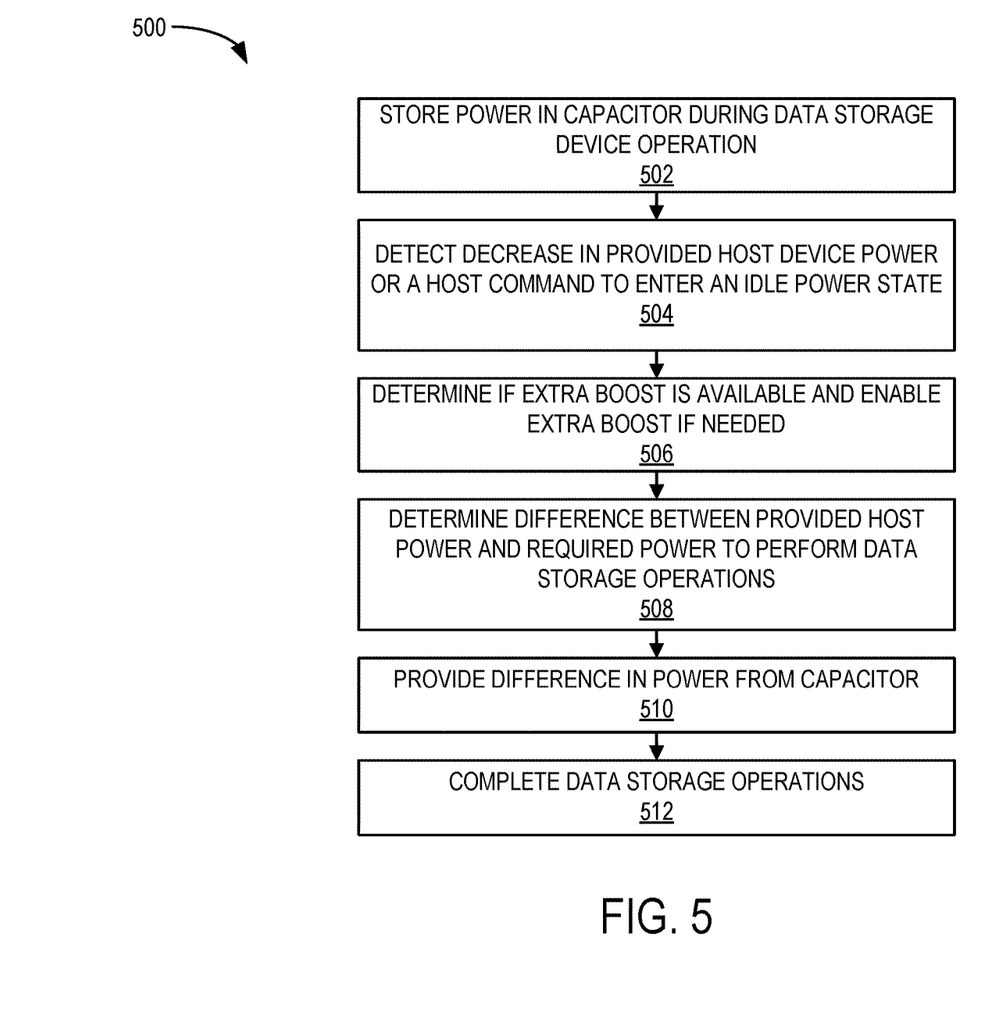
FIG. 5 depicts a flowchart illustrating a method of performing idle power consumption optimization, according to certain embodiments.

FIG. 5 depicts a flowchart illustrating a method 500 of performing idle power consumption optimization, according to certain embodiments. At block 502, power is stored in a capacitor, such as the capacitor 306, 406 of FIGS. 3A, 3B, 4A, and 4B, during data storage device, such as the data storage device 106 of FIG. 1, operation. At block 504, a controller, such as the controller 108 of FIG. 1, either detects a decrease in the provided host device power, such as the host device 104 of FIG. 1 or the external source 320, 420 of FIGS. 3A, 3B, 4A, and 4B, or receives a command from a host device 104 to enter an idle power state. The decrease in the provided host device power may be due to the data storage device 106 entering an idle power state due to a host command or an UGSD event occurring.

At block 506, the controller 108 determines whether an extra boost circuitry, such as the enable extra boost 310, 410 of FIGS. 3B, 3C, is available and whether the extra boost is needed. If the extra boost circuitry is available and needed, then the controller 108 enables the enable extra boost 310, 410. At block 508, the controller 108 determines the difference between the provided host device 104 power and the power required to perform data storage operations or data backup operations. At block 510, the difference in power is provided from the capacitor 306, 406. The difference in power may be supplied by both host device 104 and the capacitor 306, 406 via a PWM, such as the PWM 324 of FIG. 3A, 3B, or solely from the capacitor 306, 406 in the case of enabling an external cutoff, such as the external cutoff 424 of FIG. 4A, 4B, or an UGSD event occurring. At block 512, the data storage operations or the data backup operations are completed using the power supplied at block 510.

By utilizing an internal stored power to mitigate the effects of lower external power being supplied to the data storage device, the data storage device may be able to effectively execute data storage operations and data backup operations with a minimum power supplied and without exceeding a maximum power requirement.

In one embodiment, a data storage device includes a memory device, an internal power supply, and a controller coupled to the memory device and the internal power supply. The controller is configured to perform the following during data storage device idle time: electrically isolate the data storage device from an external power source and draw power from the internal power supply to perform a data storage operation. The performing the data storage operation includes at least one of garbage collection, logging, saving of a L2P table, and scanning background data.

The internal power supply is a capacitor. The external power source is a host device. The data storage device further includes an external cutoff switch to electrically isolate the data storage device from the external power source. The external cutoff switch include a transistor. The data storage device further includes an internal power supply circuit. The internal power supply circuit is coupled to the memory device and the internal power supply. The internal power supply is configured to be coupled between the external power source and the memory device. The internal power supply circuit includes a boost converter coupled between a first resistor and a second resistor. The internal power supply circuit includes a buck converter coupled between a third resistor and a fourth resistor. The internal power supply is coupled between the boost converter and the buck converter. The data storage device further includes a fifth resistor and a transistor coupled in series between the first resistor and the second resistor. The fifth resistor has a greater resistance than the second resistor.

In another embodiment, a data storage device includes a memory device, an internal power supply, a switching circuit coupled between the internal power supply and a line for receiving power from an external power source, and a controller coupled to the memory device and the switching circuit. The controller is configured to cause the switching circuit to switch between drawing power from the internal power supply and drawing power from the external power source during data storage operations during data storage device idle time. The data storage operations includes at least one of garbage collection, logging, saving of a L2P table, and scanning background data.

The switching circuit comprises a boost converter coupled between a first resistor and a second resistor and a buck converter coupled between a third resistor and a fourth resistor. The internal power supply is coupled between the first resistor and the buck converter. The first resistor and the second resistor are connected in series. The data storage device further includes a boosting circuit coupled between the first resistor and the second resistor. The boosting circuit is coupled to the boost converter. The boosting circuit comprises a transistor coupled to a fifth resistor.

In another embodiment, a data storage device includes memory means, internal power supply means, and means to perform data storage operations by drawing power from the internal power supply means during data storage device idle time. The data storage operations includes at least one of garbage collection, logging, saving of a L2P table, and scanning background data.

The data storage device further includes switching means to switch between drawing power from the internal power supply means and an external power supply. The data storage device further includes a boost circuit coupled to the internal power supply means.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device;
   an internal power supply; and
   a controller coupled to the memory device and the internal power supply, wherein the controller is configured to perform the following during data storage device idle time:
      electrically isolate the data storage device from an external power source;
      determine that the internal power supply requires extra power prior to electrically isolating the data storage device from the external power source;
      provide extra power to the internal power supply, responsive to the determining, using a boost converter, wherein the providing occurs prior to electrically isolating the data storage device from the external power source; and
      draw power from the internal power supply to perform a data storage operation, wherein performing the data storage operation comprises at least one of garbage collection, logging, saving of a L2P table, and scanning background data.

2. The data storage device of claim 1, wherein the internal power supply is a capacitor.

3. The data storage device of claim 1, wherein the external power source is a host device.

4. The data storage device of claim 1, further comprising an external cutoff switch to electrically isolate the data storage device from the external power source.

5. The data storage device of claim 4, wherein the external cutoff switch comprises a transistor.

6. The data storage device of claim 1, further comprising an internal power supply circuit, wherein the internal power supply circuit is coupled to the memory device and the internal power supply, and wherein the internal power supply is configured to be coupled between the external power source and the memory device.

7. The data storage device of claim 6, wherein the internal power supply circuit comprises a boost converter coupled between a first resistor and a second resistor.

8. The data storage device of claim 7, wherein the internal power supply circuit comprises a buck converter coupled between a third resistor and a fourth resistor.

9. The data storage device of claim 8, wherein the internal power supply is coupled between the boost converter and the buck converter.

10. The data storage device of claim 9, further comprising a fifth resistor and a transistor coupled in series between the first resistor and the second resistor.

11. The data storage device of claim 10, wherein the fifth resistor has a greater resistance than the second resistor.

12. A data storage device, comprising:
    a memory device;
    an internal power supply;
    a switching circuit coupled between the internal power supply and a line for receiving power from an external power source; and
    a controller coupled to the memory device and the switching circuit, wherein the controller is configured to:
       cause the switching circuit to switch between drawing power from the internal power supply and drawing power from the external power source during data storage operations during data storage device idle time, wherein the data storage operations comprises at least one of garbage collection, logging, saving of a L2P table, and scanning background data;
       determine that the internal power supply requires extra power prior to switching drawing power from the external power source to the internal power supply; and
       provide extra power to the internal power supply, responsive to the determining, using a boost converter, wherein the providing occurs prior to switching from drawing power from the external power source to the internal power supply.

13. The data storage device of claim 12, wherein the switching circuit comprises a boost converter coupled between a first resistor and a second resistor and a buck converter coupled between a third resistor and a fourth resistor.

14. The data storage device of claim 13, where the internal power supply is coupled between the first resistor and the buck converter.

15. The data storage device of claim 13, wherein the first resistor and the second resistor are connected in series.

16. The data storage device of claim 13, further comprising a boosting circuit coupled between the first resistor and the second resistor, wherein the boosting circuit is coupled to the boost converter.

17. The data storage device of claim 16, wherein the boosting circuit comprises a transistor coupled to a fifth resistor.

18. A data storage device, comprising:
    memory means;
    internal power supply means;
    means to perform data storage operations by drawing power from the internal power supply means during data storage device idle time, wherein the data storage operations comprises at least one of garbage collection, logging, saving of a L2P table, and scanning background data;
    means to determine that the internal power supply requires extra power prior to switching from drawing power from an external power source to the internal power supply means; and
    means to provide extra power to the internal power supply, responsive to the determining, using a boost converter, wherein the providing occurs prior to switching from drawing power from the external power source to the internal power supply means.

19. The data storage device of claim 18, further comprising switching means to switch between drawing power from the internal power supply means and the external power source.

20. The data storage device of claim 18, further comprising a boost circuit coupled to the internal power supply means.

\* \* \* \* \*